Sept. 22, 1970  H. C. PFAFF, JR  3,529,337
METHOD OF FORMING A POLE STRUCTURE
Original Filed Jan. 13, 1966  2 Sheets-Sheet 1

INVENTOR
H. C. PFAFF, Jr.

BY  ATTORNEYS

Sept. 22, 1970 H. C. PFAFF, JR 3,529,337
METHOD OF FORMING A POLE STRUCTURE
Original Filed Jan. 13, 1966 2 Sheets-Sheet 2
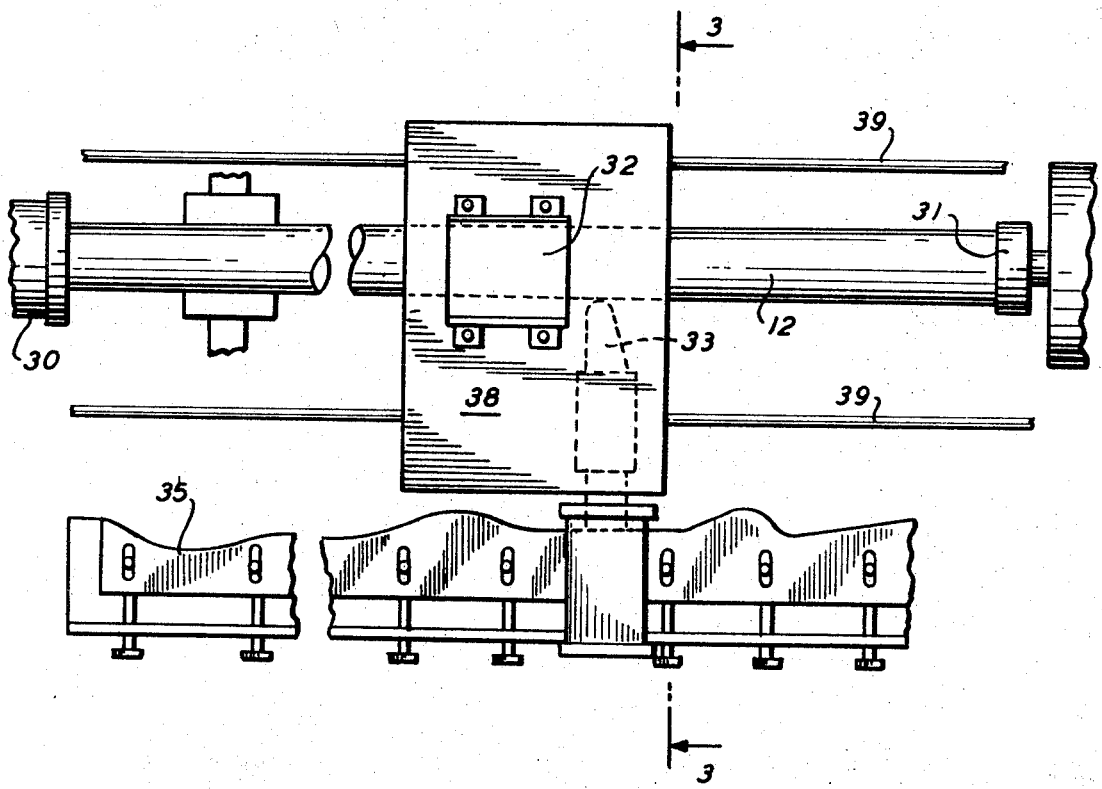
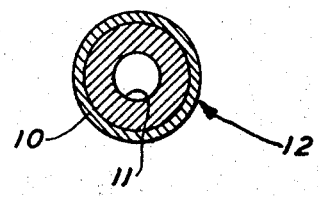
INVENTOR
H. C. PFAFF, Jr.
BY  ATTORNEYS

United States Patent Office 3,529,337
Patented Sept. 22, 1970

---

3,529,337
METHOD OF FORMING A POLE STRUCTURE
Henry C. Pfaff, Jr., Summit, N.J., assignor to Pfaff and Kendall, Newark, N.J., a corporation of New Jersey
Original application Jan. 13, 1966, Ser. No. 520,447, now Patent No. 3,370,868, dated Feb. 27, 1968. Divided and this application Feb. 1, 1968, Ser. No. 702,231
Int. Cl. B21d *39/00;* B23k *31/02;* B23p *17/00*
U.S. Cl. 29—155                                                                  7 Claims

ABSTRACT OF THE DISCLOSURE

A method of forming a composite pole comprising positioning inner and outer tubes of different materials in concentric nested relationship, rotating thereon on their axes, applying pressure radially inwardly of the assembly to taper or alter the diameter thereof, thereby axially interlocking and deforming the tubes, to define a bimetallic composite pole structure of essentially unitary form, with the characteristics of the constituent tubes.

---

Figure 1:
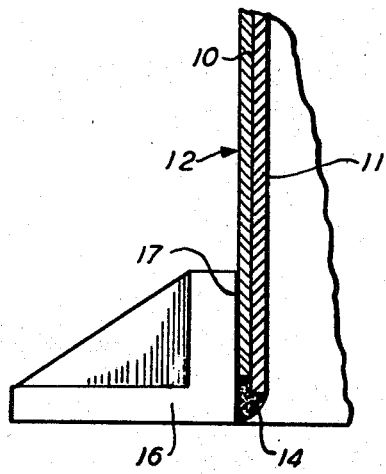

This application is a division of my co-pending application filed Jan. 13, 1966, Ser. No. 520,447, now Pat. No. 3,370,868.

This invention relates to the method of forming a seamless bimetallic pipe or pole structure having an outer tube of predetermined, preferred abrasion or other characteristics and an inner tube of contrasting properties. For example, the latter tube may be of less expensive, different, or softer material. By way of further example, the inner tube may be a stainless steel core, for stiffness, the outer tube of aluminum; for economy of manufacture the inner tube may be an inexpensive, heavy core and an expensive, thin, outer tube used. A stainless steel outer tube may be used for corrosion resistance, with an aluminum inner tube; the outer tube may be made of heavy steel, and a thinner, stainless steel inner tube used for conveying materials internally.

Substantial savings in cost of material by the improved method of and procedure for manufacture pursuant to the invention, and other advantages are achieved in forming such tube as herein set forth.

The invention is adapted for use in bridge rails, lighting poles, for bimetallic tubes, such as aluminum and stainless steel, for corrosion proof piping, metallic furniture, and for other general architectural, structural, physical and chemical purposes.

Pursuant to the method of the invention, the inner and outer tubes are assembled and positioned for rotation on their axes, and, concurrently therewith, pressure is applied as for example, by a freely rotating roller moved radially inwardly of the assembly in conformity with a template of the pattern desired for the finished pole structure. The tubes may be assembled with a base member to form an essentially unitary structure for use, for example, as a highway pole.

The drawings, illustrating procedures and devices useful in carrying out the invention, and the description below, are exemplary only of the invention, which shall be deemed to cover all other devices and procedures coming within the scope and purview of the appended claims.

Figure 2:
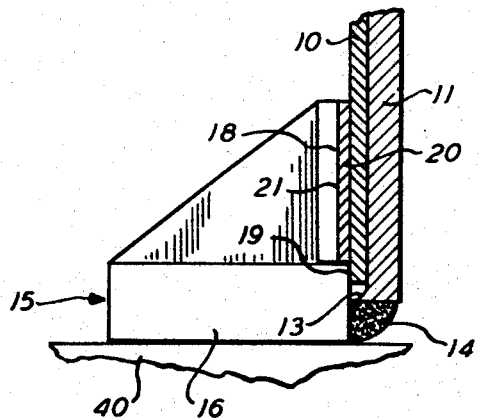
Figure 3:
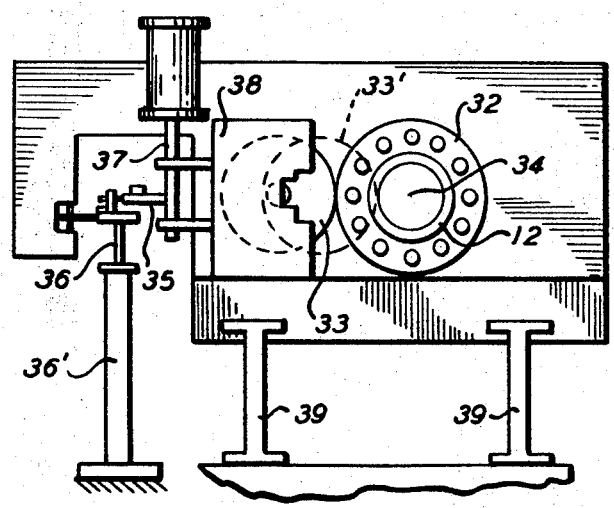

In the drawings, wherein similar reference characters indicate like parts:

FIG. 1 is a fragmentary, vertical, partly sectional view of a pole embodying the invention, shown secured to a base member, FIG. 2 is a similar view, showing another form of base member, FIG. 3 is a vertical transverse sectional view, taken at line 3—3 of FIG. 4, of a machine which may be used for fabricating the pole of the invention, FIG. 4 is a horizontal, partly fragmentary view thereof, taken at line 4—4 of FIG. 3, and FIG. 5 is a sectional view of the pole.

Pursuant to the invention, the pole 12 is shown formed of an elongated inner tube 11 positioned within outer tube 10 in essentially interfiting snug relation, with the inner tube 11 (FIG. 1) extending out of the pole 12, defined by the thus assembled tubes fabricated of predetermined relative thicknesses and different materials to provide the characteristics desired.

The extending inner end 13 of the inner tube 11 may be peened over the lower end of the outer tube (FIG. 2) and welded, as at 14 to a base member 15, interlocking the parts. The pole structure may, as shown in FIGS. 1 and 2, include a base member 15 for securing the pole structure assembly to a highway or other supporting surface 40 by bolts or the like, in the usual manner.

METHOD OF MANUFACTURE OF THE POLE

In the manufacturing method and procedure of this invention (FIG. 4) the inner and outer tubes are assembled and positioned for rotation on their axes and axially movably positioned in a suitable bearing 30 at one end and held engaged in a chuck 31 at the other end with the medial portion of the pole rotatably passing through a bearing 32. Concurrently with rotation of the pole, pressure may be applied radially inwardly to taper or alter the diameter thereof axially. A freely rotating roller 33 is mounted for reciprocation radially relative to the center 34 (FIG. 4) of the pole in conformity with a template 35 suitably positioned on a support 36 and engaged by an assembly 37 movably arranged on a casing 38 in conformity with the pattern of the template 35 (FIG. 5) which thereby determines the axial configuration of the pole.

The tubes 10, 11, are initially preferably proportioned to interfit relatively snugly; as the casing 38 moves along the rails 39 axially of the tube 12 (the latter being continuously rotated) the wheel 33 will be pressed against the pole 12 as indicated in dotted lines 33' (FIG. 3) to a greater or lesser degree depending upon the contour of the template 35. The template 35 is (FIG. 3) positioned on a suitable mounting rail 36 on suitable support 36'.

The resultant interlocking and deformation of the tubes 10 and 11 provides bimetallic pole 12 of essentially unitary form with the characteristics of the constituent tubes 10 and 11. The assembly may then be positioned in a base member 15 and secured thereto.

The base member 15 may have a planar or horizontal portion 16 and a medially apertured vertical portion 17 which may receive the pole 12, the weld 14 securing the lower ends of the tubes 10, 11 to the base member 15. The medially apertured portion 17 of the base member may be defined by an upright vertical sleeve portion 18 thereof (FIG. 2) spaced inwardly of a shouldered portion 19 of the base member 15, so that, upon positioning the pole 12 in the base member, the apertured portion 17 will, for a substantial part of the length thereof, be spaced (as at 18, FIG. 2) from the pole. The pole supporting base 15 may be positioned on or secured to a suitable horizontal supporting surface 40 (FIG. 2).

An epoxy resin or other securing means 20 (FIG. 2) may be positioned in the space between the sleeve portion 18 and the pole 12, to further secure the parts together apart from the welding procedure above described and noted at 14, or in addition thereto.

Inner pole 11 may be selected for economy of manufacture of a relativey inexpensive material; outer tube 12 may be made of thinner costlier material such as stainless steel, etc. If desired, this arrangement may be reversed where, for example, a pole is to be used as a pipe to internally convey materials, in which case the outer tube 10 may be made of heavy steel and the inner tube 11 of stainless steel.

While the foregoing disclosure of exemplary embodiments is made in accordance with the patent statutes, it is to be understood that the invenion is not limited thereto or thereby, the inventive scope being defined in the appended claims.

I claim:
1. A method of forming a pole of a pair of tubes proportioned for concentric nested assembly and a base member secured to one end of said assembly, comprising interfitting said tubes, to define an assembly,
rotating the thus assembled tubes on their axes,
concurrently applying pressure inwardly of the outer tube to thereby simultaneously deform both tubes to a predetermined desired cross sectional configuration and produce an essentially single seamless pole with the cross sectional characteristics of the inner and outer tubes providing said base member including a horizontal portion and a vertical extending sleeve portion, said horizontal portion having a vertical opening therein, said sleeve portion being located radially outwardly of the walls defining said opening and concentric therewith thereby forming a shoulder, positioning said tube assembly through the sleeve portion and into the opening in the horizontal portion with the inner tube extending to a greater depth in the opening than the outer tube, and securing the inner tube to be base member.

2. In the method set forth in claim 1, the further step which comprises forming the outer tube of relatively hard metal and forming the inner tube of softer metal.

3. In the method set forth in claim 1, the further step which comprises forming the inner tube of relative harder metal than the outer tube.

4. In the method set forth in claim 1, the further step which comprises peening the so extending end of the inner tube over the outer tube.

5. In the method set forth in claim 1, the further step which consists in so concurrently applying pressure inwardly of the outer tube by pressing a freely rotating roller circumferentially of the outer tube to predetermine the axial configuration of the tubes.

6. In the method set forth in claim 1, the further step of providing securing means in the space between the sleeve portion and the outer tube.

7. In the method set forth in claim 1, the further step which consists of peening the inner tube over the adjacent end of the outer tube.

References Cited

UNITED STATES PATENTS

| 2,219,434 | 10/1940 | White. |
| 2,293,491 | 8/1942 | Cox. |
| 2,609,595 | 9/1952 | Rossheim _____ 29—517 |
| 2,742,946 | 4/1956 | McGrann _____ 29—155 |
| 3,098,285 | 7/1963 | Kelzenberg et al. ____ 29—517 X |
| 3,137,066 | 6/1964 | Merino et al. |
| 3,152,820 | 10/1964 | Giampa et al. ___ 285—423 XR |
| 3,186,064 | 6/1965 | Buhrmaster. |
| 3,317,222 | 5/1967 | Maretzo _____ 285—55 |

FOREIGN PATENTS

| 822,983 | 10/1937 | France. |

CHARLIE T. MOON, Primary Examiner

U.S. Cl. X.R.

29—470.5, 516